United States Patent
Seban et al.

(10) Patent No.: US 8,536,981 B2
(45) Date of Patent: Sep. 17, 2013

(54) WARNING SYSTEM FOR SIGNALING THE PRESENCE OF A RADIO FREQUENCY COMMUNICATION AND MANUFACTURING METHOD

(75) Inventors: Frédérick Seban, Cassis (FR);
Jean-Luc Meridiano, Tourves (FR);
Arek Buyukkalender, Marseilles (FR)

(73) Assignee: Gemalto SA, Meudon (FR)

( * ) Notice: Subject to any disclaimer, the term of this patent is extended or adjusted under 35 U.S.C. 154(b) by 320 days.

(21) Appl. No.: 12/747,612

(22) PCT Filed: Dec. 16, 2008

(86) PCT No.: PCT/EP2008/067587
§ 371 (c)(1),
(2), (4) Date: Jun. 11, 2010

(87) PCT Pub. No.: WO2009/077516
PCT Pub. Date: Jun. 25, 2009

(65) Prior Publication Data
US 2010/0273469 A1    Oct. 28, 2010

(30) Foreign Application Priority Data
Dec. 17, 2007  (EP) ..................................... 07301683

(51) Int. Cl.
*G08B 5/22* (2006.01)

(52) U.S. Cl.
USPC ...... 340/7.6; 340/572.8; 340/572.4; 340/600; 340/691.1

(58) Field of Classification Search
USPC .................. 340/7.6, 572.8, 572.4, 600, 691.1
See application file for complete search history.

(56) References Cited

U.S. PATENT DOCUMENTS

| | | | |
|---|---|---|---|
| 2003/0042801 A1* | 3/2003 | Miyajima et al. | 310/36 |
| 2003/0173408 A1 | 9/2003 | Mosher, Jr. et al. | |
| 2004/0181629 A1 | 9/2004 | Higuchi | |
| 2005/0130389 A1* | 6/2005 | Yamazaki et al. | 438/455 |
| 2005/0287961 A1 | 12/2005 | Chiou | |
| 2006/0017573 A1 | 1/2006 | Noguchi | |
| 2006/0131375 A1 | 6/2006 | Myllymaki | |
| 2007/0095914 A1* | 5/2007 | Noguchi | 235/451 |

FOREIGN PATENT DOCUMENTS

| | | |
|---|---|---|
| EP | 1 457 915 A1 | 9/2004 |
| EP | 1 622 064 A2 | 2/2006 |
| EP | 1 814 066 A1 | 8/2007 |
| JP | 2003-211086 A | 7/2003 |
| WO | WO 2007/029325 A1 | 3/2007 |

OTHER PUBLICATIONS

International Search Report dated Mar. 23, 2009.
Non-English the Written Opinion of the International Search Authority dated Mar. 23, 2009.

* cited by examiner

*Primary Examiner* — Jennifer Mehmood
*Assistant Examiner* — Andrew Bee
(74) *Attorney, Agent, or Firm* — Buchanan Ingersoll & Rooney PC

(57) ABSTRACT

The invention relates to a warning device for signaling the presence of a radio frequency communication. The system includes an indicator perceptible to a user and an activation circuit to sense or detect energy originating from the communication and to activate the indicator. The device is distinguished in that the indicator is a vibrator. The invention also relates to a radio frequency communication device, such as a chip card, a passport, an insert, a mobile telephone, having the warning system, and a method of fabrication.

21 Claims, 2 Drawing Sheets

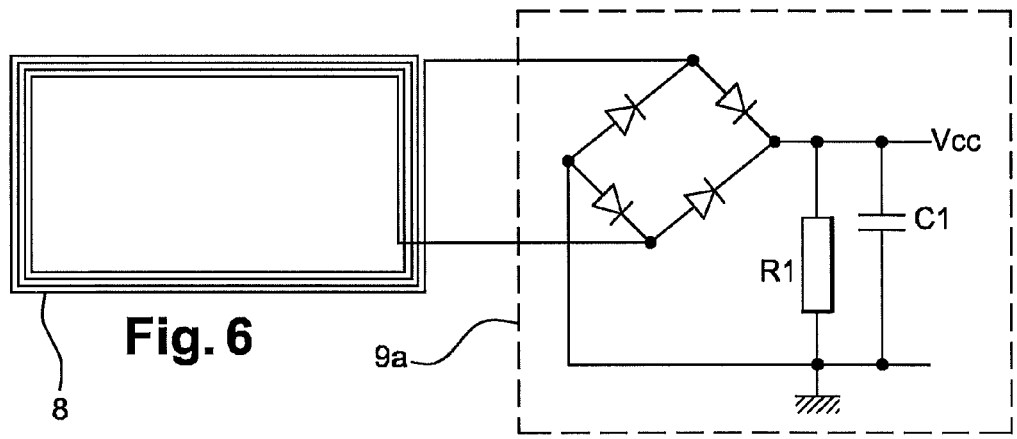
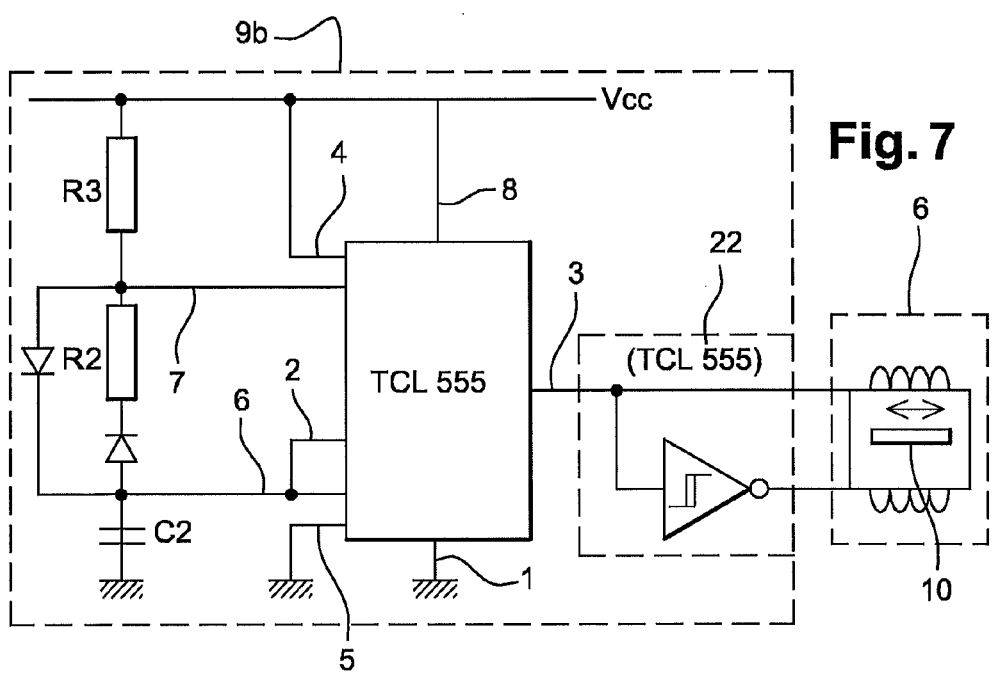
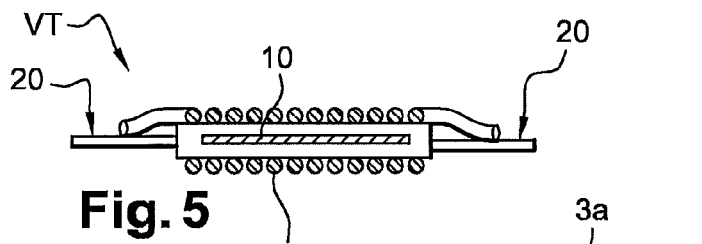
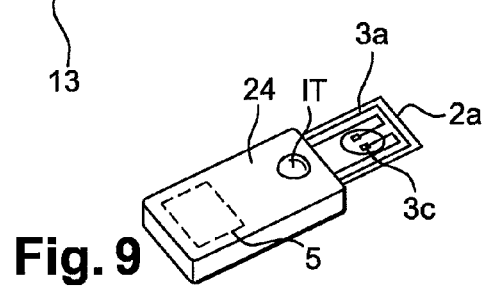
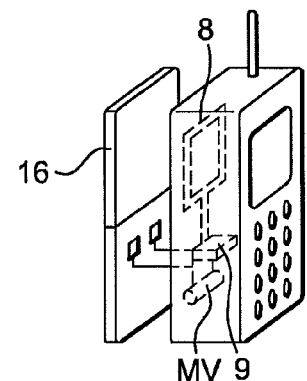

WARNING SYSTEM FOR SIGNALING THE PRESENCE OF A RADIO FREQUENCY COMMUNICATION AND MANUFACTURING METHOD

The invention relates to a radio frequency communication device comprising warning methods about its functioning under the effect of an electromagnetic field; It also relates to a warning system such as for signalling the presence of a radio frequency communication.

Such warning devices or systems are used to inform a bearer about a transaction that has been carried out and also to warn him when there has been an activity unknown to him on his communication device such as an electromagnetic induction radio frequency type card for the purpose of stealing information or units. Other devices comprise audible annunciators and also constitute the communication interface.

For example, we know about commonly used cards comprising audible annunciators and interfaces such as buzzers especially the DTMF signal generating cards or comprising indicator lights such as a light emitting diode (LED). These indicators (LEDs) are connected to an electrical circuit of the device, for example in series on an antenna or in a contactless chip card module.

The disadvantage of audible annunciators is that they are not quite and disturb the environment for example when pertaining to a contactless access door in the domain of transport. On the other hand, this solution does not suit the hearing-impaired persons. Moreover, in a noisy environment, the sound warning may not be heard.

As for as the indicator lights are concerned, they are not always perceptible when the device is buried deep inside a bag or a wallet.

The devices targeted in the first instance by the invention are preferably the contactless or hybrid chip cards, the inserts comprising a radio frequency antenna or if applicable, any antenna circuit base such as electronic passports. Such radio frequency communication devices called contactless transponders, in particular and in majority of the cases comply with the ISO-IEC 14443 standards. The communication takes place from zero to 10 cm or even up to one meter. The invention can target factors such as shape other than the cards like the USB keys. Other proximity or semi-proximity types of communications up to a few hundreds of meters are also a target. Telephone communication from mobile telephones is not targeted à priori.

One of the problems with devices comprising the contactless type of transponders targeted by the invention, and especially for sensitive applications such as bank cards, electronic wallet, e-passport, identity cards arises out of the fact that the transponder can be queried by a remote reader, and this operation can be conducted while the bearer is not even aware of it.

The aim of the invention is to provide solutions to the disadvantages listed above while enabling the user carrying a radio frequency communication device such as a card to know in a discreet manner when his device is communicating.

For this purpose, the invention in principle consists of making the user aware of the vibrations in order to inform him about the presence of a radio frequency communication.

The first aim of the invention relates to a warning system for signalling the presence of a radio frequency communication, wherein the said system comprises an indicator perceptible to a user and activation means able to sense or detect energy originating from said communication and to activate the said indicator.

The system is distinguished in that the indicator comprises a vibrator. Preferably, this vibrator is an electromagnetic or electromechanical vibrator.

Thus, the user can directly sense the presence of radio frequency communication when he presents the system, mainly by hand, to a contactless terminal or when a reader is brought close to him without his knowledge.

According to other characteristics of the system:
the activation means comprise a power supply coil meant to sense the radio frequency energy and supply induced alternating current, a matching circuit connected to the coil, wherein the said circuit is able to supply a low frequency alternating signal to the vibrator;
the vibrator comprises a mobile magnetic core in a tube and at least one drive coil connected to the matching circuit; Thus it is very simple to build and can be incorporated in a little thick body such as a chip card.
the vibrator comprises two flat drive coils (in 2D) provided at the two ends of the tube. This helps in simplifying the fabrication of the drive coils at the same time as the coil or antenna and to gain space in terms of thickness.

The purpose of the invention is also a communication device comprising radio frequency communication methods, such as a chip card, a passport, an insert, a mobile telephone; This device is distinguished in that it comprises the warning system given above.

Because of the invention, we have a warning system that can be, as decided by the user, connected or structurally independent or combined with the communication device. The advantage of the system is that it can be moved to a place that is more sensible from a user's viewpoint while still being exposed to the communication, for example, in a watch, a bracelet while the contactless card is in a bag, a wallet or a mobile telephone.

According to other characteristics of the device:
the device comprises a flat base such as a card body, a substrate of an identity document, wherein the vibrator oscillates parallel to the plane of the base or the substrate, thereby enabling optimised oscillation amplitude in a card;
the device comprises an antenna connected to an integrated circuit module, wherein the antenna also constitutes the power supply coil of the warning system, thereby enabling the system to be simplified and facilitating the fabrication;
the device constitutes a portable telephone communication apparatus comprising an internal vibrator that can be activated by telephone call, wherein the internal vibrator also constitutes the vibrator of the warning system; thus, the user is effectively warned with a larger vibrator that makes the entire system vibrate even when the contactless transaction card or other object is incorporated in the mobile or is associated with it; We also save on a vibrator.

The purpose of the invention is also two fabrication methods of a communication device comprising a warning system described above.

Other characteristics and advantages of the invention will appear on reading the description, which is given only as a non-exhaustive example and by referring to the appended drawings wherein:

FIG. 1 schematically illustrates a radio frequency communication device comprising a vibrating system or circuit compliant with a form of embodiment of the invention that can possibly enable it to work alone independently;

FIG. 5 illustrates an embodiment example of an electromagnetic vibrating capsule for vibrating system according to the invention;

FIGS. 6 and 7 illustrate an example of electronic circuit diagram for vibrating system according to the invention;

FIG. 8 illustrates another radio frequency communication device such as a portable telephone integrating a vibrating circuit compliant with a form of embodiment of the invention.

FIG. 9 describes a base, which may or may not be communicating, for the vibrating system compliant with the invention and enabling practical association with a communication device, such as in the form of RF or combi-card contactless chip card.

Figure 1:
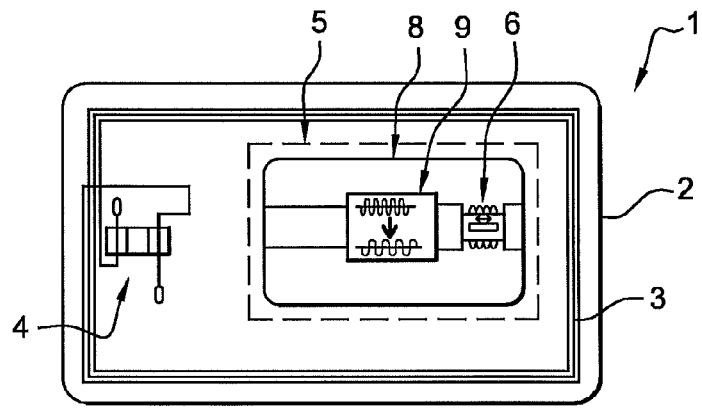

With regard to FIG. 1, in the example an electronic radio frequency transaction device 1 (or contactless product) is in the form of a chip card or integrated circuit chip base; However other forms of embodiments can implement or include the invention's methods, such as a USB key or any other electromagnetic communication portable object.

The card, in a known manner, comprises a card base or body 2 having an electromagnetic antenna 3 in the flat base. This antenna is connected to the terminals of an integrated circuit chip or to that of an electronic module or electronic component 4 having a chip.

The chip is able to implement at least one software application saved inside to execute an electronic transaction such as bank payment, a points, units, loyalty debit/credit operation, access control operation, authentication operation, etc. The application can be implemented by interacting with a reader or a radio frequency terminal or another device of the same type as the invention having a NFC (Near field communication) type function.

The device 1 can also comprise a switch capable of enabling a radio frequency operation of the device when the switch is turned on and stopping the operation when the switch is turned off.

The communication device 1 comprises a warning system or vibrating circuit 5 associated with it and described as given below. Here, this system is fixed on the card body but can be planned to be fully independent on a separate base that could be inserted in a pocket corresponding to the body of the device or vice versa. If needed, mechanical fastening or coupling methods can be planned between the two, such as an adhesive.

In the meaning of the invention, the communication device must be understood in the broad sense: for example, it can be reduced to the warning system since it is able to signal only to itself information about the presence of magnetic field. In addition, through field modulation (Morse-code based coding, etc.), the way in which the warning system vibrates can also be used to provide information (coded for example) to a user.

The warning system is designed to signal the presence of a radio frequency communication or radio frequency field RF; In the example, the field has the frequency of 13.56 MHz in compliance with the ISO-IEC 14443 standards. Other communication applications at other frequencies are also possible. Preferably, based on a desirable method, the communication energy (of the reader) must allow generating the energy that is needed by the vibrating system.

According to one characteristic, this system comprises or is at least associated with a RF communication or RF energy indicator 6, which is perceptible by a user, for example in the hand or through a wallet, or even in a pocket; the system also comprises activation means 8, 9 that are preferably capable of capturing the energy originating from this RF communication or field; These methods of activation are capable of activating the indicator, According to the invention, the indicator comprises a vibrator; here it is of the electromagnetic or electromechanical type; This vibrator vibrates or oscillates under the effect of induced current and corresponding field.

The vibrator can have the means likely to cause vibrations perceptible by the user, when he, for example, holds the system in the hand. The invention can à priori exclude DTMF type buzzers or micro loud-speakers that generate loud and sharp sounds as the telephone rings. However, the vibrator can also be a vibrating membrane at a low frequency. A flat capsule, with the membrane oscillating perpendicular to a main plane of a base, wherein the drive coil is in the base's main plane.

The frequencies targeted by the invention are preferably non audible frequencies. For example, the frequencies under 1 K Hertz or 500 Hertz, or even 100 Hertz can be suitable.

Figure 2:
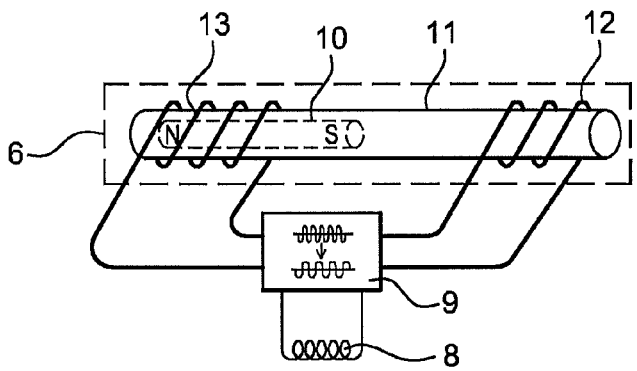
FIG. 2 illustrates the simplified schematic diagram of the vibrating system in accordance with a form of embodiment.

In FIG. 2, according to a simplified schematic that illustrates the first embodiment example, the methods of activation include a power supply coil 8 meant to sense the radio frequency energy and supply induced alternating current, which is powerful enough to activate the invention's indicator; In addition, the methods of activation include a matching circuit 9 connected to the coil 8; this circuit is designed to supply an alternative signal, preferably low frequency, to the vibrator. The low frequency is connected to the type of vibrator used by the invention mainly in the chip card application. For example, micro rotating machines can also be designed and this may be at other frequencies.

Since we are using a mini-capsule having thickness under 1 mm, here the matching circuit is capable of dividing the frequency of the sensed energy by at least 1000 in order to get a low vibration frequency having a value less than the threshold of 20 Hz.

The vibrator comprises a mobile core 10 (for example a magnet, or metallic part such as a rod) in a tube or a capsule 11 and at least one drive coil 12, 13 connected to the matching circuit. The coil 12 surrounds the tube to effectively induce an electromagnetic field axially in the tube and dynamically call up the core. The vibrator comprises a rigid mini-tube resistant to bending of the body or flexible by itself and a metallic part able to slide and tap at the two ends of the tube alternately on each change of phase.

Figure 3:
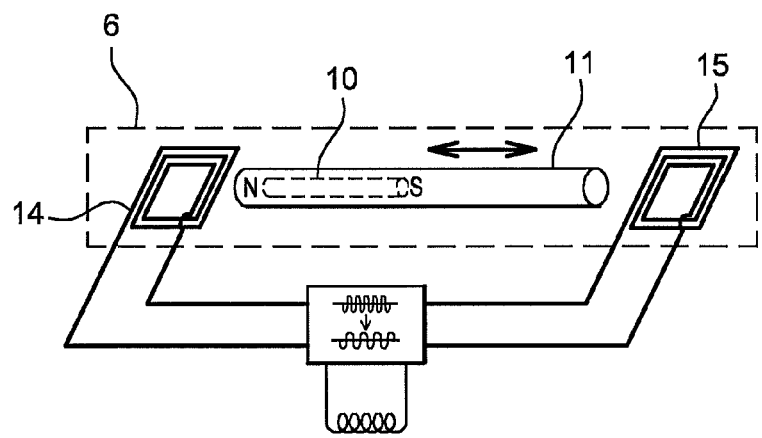
FIG. 3 illustrates another simplified schematic diagram of the vibrating system in accordance with a second form of embodiment.

In FIG. 3, according to another form of embodiment, the vibrator comprises two flat drive coils 14, 15. Here, they are placed at two ends of the tube. This mode is beneficial for the fabrication of coils that can be done at the same time as the power supply coil 8. If required, the coil can be dispensed with, since the energy is collected by the drive coils 14 and/or 15.

Figure 4:
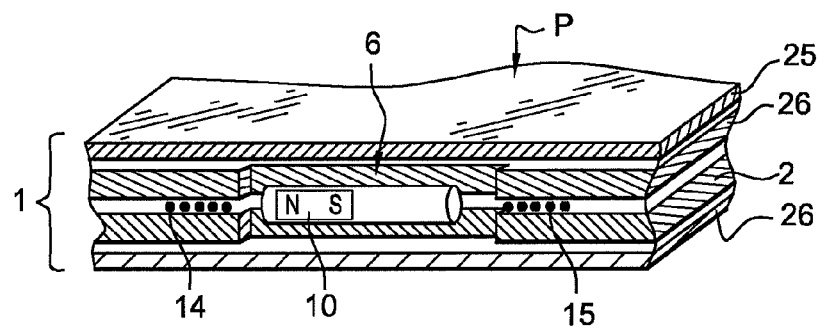
FIG. 4 illustrates an embodiment and/or integration example of the vibrating system compliant with the invention in a planned base or insert mainly in case of a chip card or electronic passport.

FIG. 4 illustrates a warning insert to be incorporated in a communication device comprising radio frequency communication methods, such as a chip card, a passport, or even mobile telephone as indicated below.

The insert comprises a body forming a flat base P such as the body of a card, a substrate of an identification document, etc. The vibrator 6 or at least the core or rod 10 oscillates here parallel to the plane of the base or the substrate to offer greater amplitude to the movement and more inertia than in a direction perpendicular to the plane. The dimension of the capsule 11 ranges from 5 to 10 mm and has a thickness of 0.5 mm. The capsule has a cavity developed in the sheets 2, 26; Two optional covering sheets 25, 27 can close the cavity.

The core or the balls may be placed without capsule directly in a cavity of the body. Metallic pieces are fixed at the ends of the cavity to tap against the mobile core.

According to an advantageous form of embodiment, since the device already comprises an antenna 3 connected to an integrated circuit module 4, we plan to use this antenna to also constitute the power supply coil of the warning system. Thus it is possible to have a single antenna connected, for example, in parallel on module 4 and the matching circuit 9. The antenna can be matched so as to take the additional impedance of the warning circuit into account.

In FIG. 8, the warning system is incorporated in a communication device constituting a portable telephone.

According to an advantageous mode, the internal vibrator MV of the mobile telephone, which can generally be activated by telephone call, is used in addition or constitutes the vibrator 6 of the warning system.

This allows using the vibrator or any indicator already in place, which is naturally more powerful and perceptible than the one incorporated in a card. A coupling or matching circuit can be planned between the indicator used in the mobile and a sensing device capable of detecting or capturing a communication, such as RF.

The vibrator MV can be connected in different ways to the sensing device according to the invention. In a variant, the antenna can sense a field and through the induced current activate a relay (not shown) that will connect the battery to the vibrator.

In another variant, the antenna can sense the energy that will, as described above, help in supplying power through a matching circuit or a power supply controller to the internal vibrator of the device and/or to the system's vibrator.

Since the antenna is mainly designed for NFC type of communication, it is mounted on points C4, C8 of a dual chip (ISO7816.3 and NFC contactless). Other "Wi-Fi" or "Bluetooth" type of communication that integrate one or more contactless and/or ISO 7816.3 functions can be planned. As an operating example, when the NFC function is called, by detection of contactless type frames in the chip, the chip's processor is made to interrupt in order to send a signal or a command to the mobile to activate the vibrator mainly from the battery of the host device or from the sensed radio frequency energy.

The antenna can also be connected to a NFC type chip that is connected to the terminal and/or to a SIM card. On detection of the RF communication by the NFC chip, at the beginning, during or at the end of the transaction, a command or activation signal from an indicator is sent to the terminal to act on an indicator (sound, vibrator, light). If required, the RF field, mainly through the NFC chip, supplies energy to the mobile's indicators.

In FIG. 9, if applicable, all or part of the warning system's methods can be included in a portable box 24 or equivalent host object. A contactless card 2a (communication device) and/or the warning system 5 can both be slid or be included or be part of the box (as a receiving or grouping system). If required, the box can comprise mainly a communication antenna or coil of the warning system and/or of the card. The box can comprise a source of supplementary power supply and/or a passive relay antenna to increase the range or amplify the radio frequency signal. In the latter case, the contactless function can be executed in a chip module of antenna module type, which is inserted in the card's body, with the relay antenna being in the box.

In a preferred method, the warning system 5 as accessory is found in the wall of the box or slid in the box at the same time as the card. In fact, it is the warning system that has an insertion pocket or methods for fixing the contactless card.

The box, as indicated, can have a battery that, while it is connected, will enable the power supply contacts of a contactless chip to mainly increase the range of a communication and/or power supply to the vibrator. If required, an IT switch can be placed on the box to enable communication, especially by closing the antenna circuit 3a having contacts 3c or by eliminating a short-circuit that inhibits the operation.

If required, the button of the box (IT) is used to close both the circuit of the card's antenna and that of the system's coil, which authorises both of them to operate simultaneously when there is communication.

According to another variant, we can plan an opto-coupler in series on the transaction transponder's antenna circuit (such as transport, payment, etc.). This opto-coupler closes a feeding circuit of the vibrator when the transponder is active in a RF field. The feeding circuit can be a coil or any source such as a battery.

through an opto-coupler type component (electrical insulation so as not to penalise the transponder's overall impedance All or part of the vibrator's activation energy can originate either from the battery, or the antenna, or both depending on the state of the battery or an energy saving method of one and/or the other associated object. An energy monitor planned in the chip of the contactless communication object or in the mobile, selects the available energies mainly based on their level. The box or similar object can include other means of communication or a communication interface for the chip card such as an adaptor or USB connector, a MMI interface (keyboard, monitor), etc.

The fabrication of a communication device 1 comprising a warning system can include the steps shown in the two methods given below.

In accordance with the first method of implementation, the process includes the following steps according to which:

at least one power supply coil 8 and at least one drive coil 12, 13 are made on a base sheet 2, mainly by overlaying or embroidering of conducting wires;

an electromagnetic vibrator 6 is brought and fixed in a cavity developed in the sheet 2, we have a matching circuit 9 in a matching module (electronic component on an insulating substrate bearing contact points or pads) that can be brought in a cavity developed in the sheet and that we can connect to the terminals of the power supply coil 8.

The covering sheets for the antenna 26 and/or the capsule (25, 27) can be laminated from top. A resin can also fill up the capsule's pocket.

According to another method of implementation, the process includes the following steps according to which:

at least one power supply coil 8 is made on one base sheet 2 a tubular electromagnetic vibrator 6 comprising a concentric drive coil VT and connection pads 20 is brought in the cavity developed in the sheet, we have a matching circuit 9 in a matching module (not shown), (for example, like a contactless chip card module) that can be brought in a cavity developed in the sheet and that we can connect to the terminals of the power supply coil 8.

Decorative or covering sheets can cover the assembly.

The base sheets made in this way can be added or integrated to other components, mainly the radio frequency communication components or devices, RFID transponders, etc. The same sheet can also include these components.

In FIG. 6, the power supply coil 8 of the system is connected to a matching circuit 9 matching the received energy to the needs of the vibrator. The matching circuit comprises a bridge rectifier 9a of the induced current to create a stabilised power supply Vcc for supplying power to the components. Circuit 9 also comprises a frequency divider 9b placed at the output of the bridge rectifier. Once the signal is retrieved by the coil, the bridge rectifier is used to create stabilised power supply Vcc.

The matching circuit also comprises a frequency divider 9b; It is preferably capable of dividing the frequency of the sensed energy by at least 1000, to get a low vibration frequency with value less than the threshold of 20 Hz. In the example, the component values are selected so as to get an alternative frequency signal equal to 3 Hz on the output 3.

The polarity of the signal is changed by an inverter 22 at the terminals of the vibrator's drive coil 6, (given very schematically here) in order to make the ferrite 10 located within it oscillate.

Transaction management methods to be undertaken with the communication device can be planned in order to alert about not only the presence but also the start or the end of a transaction. Management methods can also be planned to activate the chip's signal meant for the mobile at the end of the transaction or in case the transaction fails. The failure or the success or the status of a transaction, can be informed to the user through the warning system, by one or more vibration sequences in accordance with a determined convention. The frequency can also be modified in accordance with a selected convention or mode to alert the user.

The invention claimed is:

1. A warning system for signaling the presence of a radio frequency communication, said system comprising an indicator perceptible to a user and activation means configured to sense or detect energy originating from said communication and to activate said indicator, wherein the indicator comprises a vibrator, and
    wherein said activation means comprises a frequency divisor that divides a frequency of the sensed energy originating from said communication, and applies the divided frequency to the vibrator.

2. A system according to claim 1, wherein the activation means comprise:
    a power supply coil to sense radio frequency energy and supply induced alternating current, and
    a matching circuit connected to the coil, wherein the circuit is capable of supplying the divided frequency signal to the vibrator.

3. A system according to claim 2, wherein the matching circuit is capable of dividing the frequency of the sensed energy by at least 1000 in order to get a low vibration frequency having a value less than the threshold of 20 Hz.

4. A system according to claim 2, wherein the vibrator comprises a mobile core in a tube and at least one drive coil connected to the matching circuit.

5. A system according to claim 4, wherein the vibrator comprises two flat drive coils placed at two ends of the tube.

6. A communication device configured to signal a presence of a radio frequency communication, the device comprising:
    an indicator perceptible to a user, wherein the indicator comprises a vibrator; and
    an activator configured to:
        sense or detect energy originating from the radio frequency communication, and divide a frequency of the sensed energy originating from said communication; and
        apply the divided frequency to the vibrator.

7. The device according to claim 6, wherein the device further comprises a flat base, wherein the vibrator is configured to oscillate parallel to the plane of the base.

8. The device according to claim 6, wherein the device is structurally independent of a source of the radio frequency communication.

9. The device according to claim 6, further comprising an antenna connected to an integrated circuit module, wherein the antenna also constitutes a power supply coil of the device.

10. The device according to claim 6, constituting a portable telephone communication device comprising an internal vibrator that can be telephonically activated, wherein the internal vibrator also constitutes the vibrator.

11. The device according to claim 6, wherein the device further comprises a chip card.

12. The device according to claim 6, wherein the device further comprises a passport.

13. The device according to claim 6, wherein the device further comprises a mobile telephone.

14. The device according to claim 6, wherein the device further comprises an insert.

15. The device according to claim 6, wherein the device further comprises a communicating box.

16. The device according to claim 7, wherein the flat base further comprises a card body.

17. The device according to claim 7, wherein the flat base further comprises a substrate of an identity document.

18. A method for signaling the presence of a radio frequency communication, the method comprising:
    sensing or detecting, by an activation means, energy originating from the radio frequency communication, wherein said activation means comprises a frequency divisor that divides a frequency of the sensed energy originating from said communication;
    in response to sensing or detecting the energy, applying the divided frequency to a vibrator perceptible to a user; and
    indicating, by the vibrator, the communication.

19. The method according to claim 18, wherein:
    the sensing or detecting comprises sensing or detecting, by a power supply coil of the activation means, the energy; and
    the indicating comprises:
        supplying, by a matching circuit of the activation means, the divided frequency signal to the vibrator; and
        vibrating, based on the signal, the vibrator.

20. The method according to claim 19, wherein:
    the matching circuit is connected to the coil.

21. A communication device configured to signal a presence of a radio frequency communication, the device comprising:
    a vibrator;
    two drive coils, wherein the two drive coils are perpendicular to a longitudinal axis of the vibrator and respectively located at each end of the vibrator;
    an activator; wherein said activator comprises:
        a power supply coil, wherein the power supply coil is configured to sense radio frequency energy and supply induced alternating current, and
        a matching circuit connected to the two drive coils, wherein the matching circuit is capable of dividing the frequency signal of the sensed radio frequency energy and supplying the divided frequency to the vibrator through the two drive coils.

\* \* \* \* \*